United States Patent
Blanchard et al.

(10) Patent No.: US 9,784,114 B2
(45) Date of Patent: Oct. 10, 2017

(54) ROTATING ASSEMBLY FOR A TURBOMACHINE

(71) Applicant: SNECMA, Paris (FR)

(72) Inventors: Stephane Pierre Guillaume Blanchard, Chartrettes (FR); Youki Olivier Ito-Lardeau, Paris (FR)

(73) Assignee: SNECMA, Paris (FR)

( * ) Notice: Subject to any disclaimer, the term of this patent is extended or adjusted under 35 U.S.C. 154(b) by 257 days.

(21) Appl. No.: 14/694,424

(22) Filed: Apr. 23, 2015

(65) Prior Publication Data
US 2015/0308279 A1    Oct. 29, 2015

(30) Foreign Application Priority Data

Apr. 24, 2014 (FR) .................................. 14 53717

(51) Int. Cl.
*F01D 5/02* (2006.01)
*F01D 5/22* (2006.01)
(Continued)

(52) U.S. Cl.
CPC .............. *F01D 11/006* (2013.01); *F01D 5/02* (2013.01); *F01D 5/225* (2013.01); *F01D 5/3015* (2013.01);
(Continued)

(58) Field of Classification Search
CPC .......... F01D 5/02; F01D 5/225; F01D 5/3084; F01D 11/006; F01D 11/06; F01D 5/3015;
(Continued)

(56) References Cited

U.S. PATENT DOCUMENTS

| 4,192,633 A | 3/1980 | Herzner |
| 4,507,052 A | 3/1985 | Thompson |

(Continued)

FOREIGN PATENT DOCUMENTS

| EP | 1 584 794 A1 | 10/2005 |
| EP | 2 626 518 A1 | 8/2013 |

(Continued)

OTHER PUBLICATIONS

French Preliminary Search Report with written opinion issued Feb. 2, 2015 in French Application 14 53717, filed on Apr. 24, 2014 (with English Translation of Categories of Cited Documents).

*Primary Examiner* — Igor Kershteyn
(74) *Attorney, Agent, or Firm* — Oblon, McClelland, Maier & Neustadt, L.L.P.

(57) ABSTRACT

A rotating assembly for a turbomachine, including a disc having an external periphery with alternating recesses and teeth, blades extending radially from the disc and the feet of which are axially engaged and radially retained in the recesses of the disc, platforms extending on the circumference from the blades and being arranged end to end on the circumference, with respect to each other, axial sealing device upstream and/or downstream of an annular zone extending radially from the platforms up to the disc. The sealing device radially includes an internal annular portion and an external annular portion structurally distinct from each other, and the external annular portion of which is elastically constrained radially inwards by the internal annular portion.

13 Claims, 2 Drawing Sheets

(51) Int. Cl.
*F01D 5/30* (2006.01)
*F01D 11/00* (2006.01)

(52) U.S. Cl.
CPC .......... *F01D 5/3084* (2013.01); *F01D 11/003* (2013.01); *F05D 2220/30* (2013.01); *F05D 2240/55* (2013.01); *F05D 2260/231* (2013.01); *F05D 2260/30* (2013.01); *Y02T 50/672* (2013.01)

(58) Field of Classification Search
CPC ............. F05D 2220/30; F05D 2240/55; F05D 2260/231; F05D 2260/30; Y02T 50/672
See application file for complete search history.

(56) References Cited

U.S. PATENT DOCUMENTS

| | | | | |
|---|---|---|---|---|
| 5,310,319 A | * | 5/1994 | Grant | F01D 5/082 416/220 R |
| 7,566,201 B2 | * | 7/2009 | Brillert | F01D 5/081 29/889.2 |
| 8,007,230 B2 | * | 8/2011 | Hafner | F01D 5/08 415/173.7 |
| 8,459,953 B2 | * | 6/2013 | Haffner | F01D 5/3015 416/219 R |
| 8,696,320 B2 | * | 4/2014 | Harris, Jr. | F01D 5/26 416/244 R |
| 8,753,090 B2 | * | 6/2014 | Basiletti | F01D 5/326 416/221 |
| 9,181,810 B2 | * | 11/2015 | Dimmick, III | F01D 5/3015 |
| 2005/0271511 A1 | | 12/2005 | Pasquiet | |
| 2010/0166560 A1 | | 7/2010 | Blanchard et al. | |
| 2011/0123341 A1 | | 5/2011 | Aubin et al. | |
| 2013/0202433 A1 | | 8/2013 | Hafner | |
| 2013/0272886 A1 | | 10/2013 | Dimmick, III et al. | |

FOREIGN PATENT DOCUMENTS

| | | | | |
|---|---|---|---|---|
| EP | 2 653 660 A1 | | 10/2013 | |
| FR | 2 413 542 | | 7/1979 | |
| FR | 2 930 603 A1 | | 10/2009 | |
| FR | 2 940 353 A1 | | 6/2010 | |
| FR | GB 2527192 A | * | 12/2015 | ............... F01D 5/02 |
| JP | 2013-234588 | | 11/2013 | |
| JP | 5358031 | | 12/2013 | |

* cited by examiner

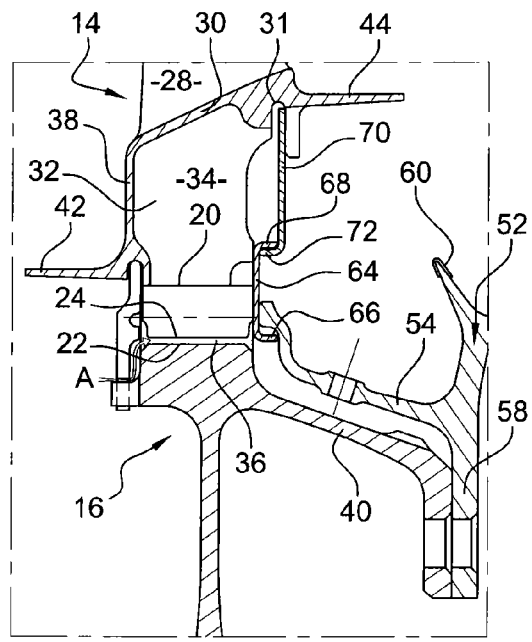
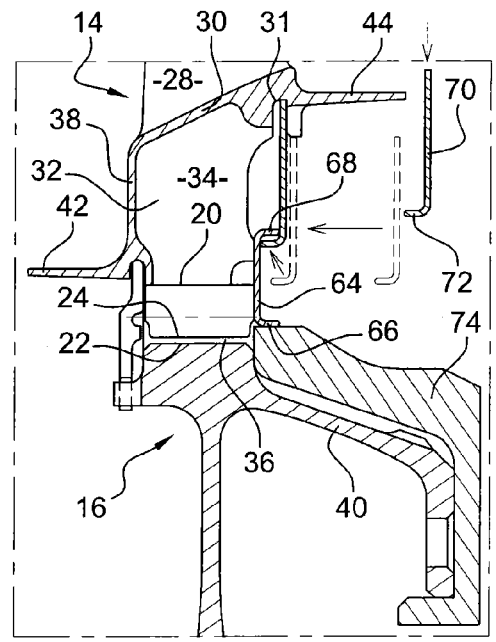
Fig. 3    Fig. 4
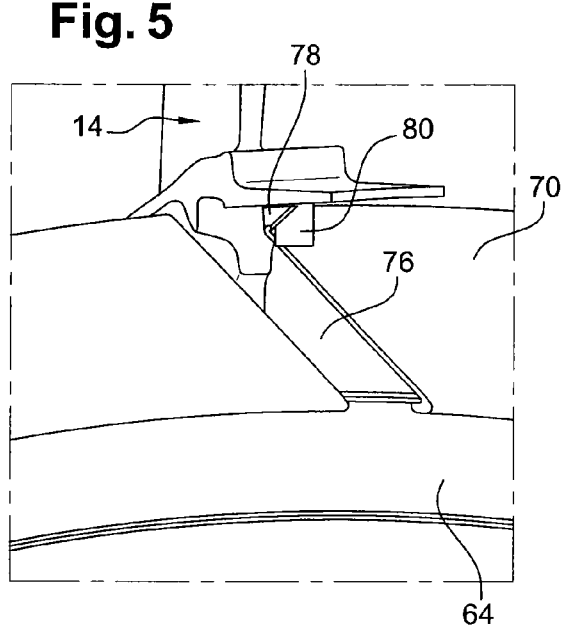
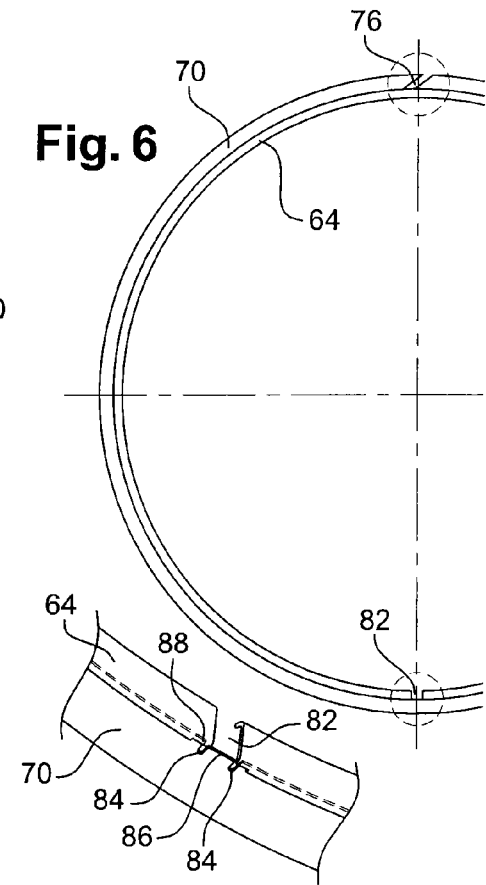
Fig. 5    Fig. 6

ROTATING ASSEMBLY FOR A TURBOMACHINE

BACKGROUND OF THE INVENTION

Field of the Invention

The invention relates to a rotating assembly for a turbomachine, such as, more particularly, a turbojet engine in a plane, as well as a turbomachine comprising such an assembly.

Discussion of the Background

Such an assembly, which can be found, in particular, in a turbine, comprises a disc, and blades extending radially outwards from the disc and the feet of which are axially engaged and retained radially in of the recesses of the external periphery of the disc, said recesses alternating with teeth of the disc. The blades also comprise internal platforms arranged end to end on the circumference, so as to define together the internal limit of the flow of hot gas circulating in the turbine. The portion of the blade located inside relative to the jet, i.e. between the internal platform and the root, is called a tang. According to such positioning, spaces are formed between two adjacent tangs, and form inter-tang or inter-blade cavities. So-called recess bottom cavities are also formed by radial spaces located between the blade roots and the bottoms of the recesses.

In order to improve the performances of the turbomachine, and to prevent any heating of the disc by the flow of hot gas leaving the upstream combustion chamber and flowing through the jet, it is important to limit at most the circulation of such gas under the platforms and through the inter-blade cavities, using sealing means. As a matter of fact, the portion of the jet gas flowing under the platforms does not participate in the driving into rotation of the blades and directly heats the teeth of the disc. It is particularly advantageous to arrange the sealing means downstream of the inter-blade cavities so as to enable a pressurisation of such cavities to a value substantially identical with the one of the jet gas, which limits the suction effect in the cavities.

In the prior technique, for example in U.S. Pat. No. 4,507,052, a rotating assembly is provided for a turbomachine, comprising:
  a disc having an external periphery having alternating recesses and teeth,
  blades extending radially from the disc and the roots of which are engaged axially and retained radially in the recesses of the disc,
  platforms extending circumferentially from the blades and which are arranged circumferentially end to end, with respect to each other,
  axial sealing means for an upstream and/or downstream sealing of an annular zone extending radially between the platforms and the disc, said sealing means radially comprising an internal annular portion and an external annular portion structurally distinct from each other.

Problems however exist, which concern sealing and efforts applied onto some moving parts (platform, disc . . . ), when the turbomachine is operating.

Additionally, when the blades are made of Ceramic Matrix Composite (in the following referred to as C.M.C.), the platforms also made of C.M.C. are even less able to bear the weight of the rotating trim strip, with the density ratio between a metallic material and a C.M.C. material ranging from three to four. Besides, as the dilatation ratio with an increased temperature ranges from two to three, the differential dilatations in operation between the trim strip on the one hand, and the blades and the disc on the other hand, may either enhance the constraints generated on the platforms, or create clearance enabling the circulation of the jet gas at the radial ends of the trim strip.

SUMMARY OF THE INVENTION

The present invention offers a simple, efficient and economical solution to the sealing problem in the inter-blade cavities, while eliminating the drawbacks entailed in the prior art solutions.

For this purpose, it provides that the rotating assembly for turbomachine mentioned above, which can be partially compared with the one of U.S. Pat. No. 4,507,052, should be such that, when the rotating assembly is stopped, the external annular portion should be mounted so as to be elastically constrained radially inwards by the internal annular portion with which it is engaged.

Thanks to the invention, when the assembly is rotated, the platforms generally no longer support any load from the rotating sealing means, since the sealing means is radially divided into two portions, with the internal portion constraining the external portion inwards and thus preventing it from bearing against the platforms of the blades, in spite of the centrifugal effects and the dilatations. The blade can thus be designed with a greater freedom, for instance with a C.M.C. design, and the fatigue of the platforms can thus be more generally reduced. Besides, such constraint between the internal portion and the external portion implies a close fit or coupling between such two portions, which makes it possible to provide a correct sealing between the internal portion and the external portion, whatever the operating conditions. Axial sealing of the annular zone extending radially from the platforms up to the disc, which comprises the inter-blade cavities, can thus be preserved, with such sealing being equivalent to the one provided by the sealing means consisting of only one annular element.

The sealing means of the invention are preferentially formed downstream of said annular zone so as to enable a pressurisation of the inter-blade cavities at a value substantially identical with the one of the jet gas, which limits the suction effect in such cavities.

According to another characteristic of the invention, including when the rotating assembly is stopped (no movement), the internal portion is also elastically deformed radially outwards by the external annular portion, even though the external annular portion of the sealing means is thus elastically deformed radially inwards by the internal annular portion.

Such mounting makes it possible to provide a radial relative fitting between the internal portion and the external portion of the sealing means. The two portions, radially shifted relative to one another, cooperate and elastically deform each other radially up to a radial position of equilibrium where the elastic return forces counterbalance, and such position can be predetermined. Such mounting constantly pre-constrained by the elastic return forces makes it possible to ensure that tight contact will be preserved between the internal portion and the external portion of the sealing means, whatever the operating conditions.

The internal annular portion and the external annular portion of the sealing means advantageously consist of an internal split-ring and an external split-ring respectively, with the respective slits of the rings being diametrically opposed.

Two slits are thus opposed and balanced in the sealing means, which prevents unbalance from being generated when operating, unlike the prior art which provides only one ring and thus only one slit.

The slit of the external split-ring is preferably inclined with respect to a radius of the ring, so that the external split-ring has a peak opposite the external end of the slit, with such peak being folded axially to form a circumferential support against a stop provided on one of the platforms.

The rotation between the external split-ring and the rest of the rotating assembly can thus be easily locked.

According to another characteristic, rotation locking means is formed between the internal annular portion and the external annular portion of the sealing means.

The two slits described above can thus remain diametrally opposed, whatever the operating conditions.

To limit the radial stress on the platforms, it is additionally recommended that the internal portion of the sealing means should have an axial annular rim on the internal end which will hold it radially by engagement with an annular arm of a shroud mounted downstream or upstream of the disc.

Such shroud will for instance be a sealing ring comprising annular sealing elements intended to sealingly cooperate with an external stator element.

In order to provide perfect sealing while taking advantage of the above solution, the internal portion of the sealing means shall advisedly be held axially against the disc by said annular arm which will then directly bear thereon.

Preferably, the (radial) engagement between the respectively internal and external annular portions will comprise an axial annular rim axially shifted apart from the disc and formed on the external end of the internal portion of the sealing means and fixed to an axial annular rim formed on the internal end of the external portion of the sealing means. Such rims are more particularly cylindrical.

Such annular internal and external portions of the sealing means shall then not radially bear against the disc and the internal surface of the blades like in U.S. Pat. No. 4,507,052 wherein sealing depends on such bearing.

The annular rim of the internal portion will advantageously be engaged outside the rim of the external portion. The elastic return forces tend to radially separate the internal and external portions, which creates a tight bearing between the two rims. If bearing is ensured on the whole circumference of the rims, sealing between the internal portion and the external portion of the sealing means will be easier.

According to another particular embodiment, the external portion of the sealing means comprises an external end engaged in a radial annular groove formed on the internal faces of the platforms, with said external portion radially abutting against the above-mentioned arm of the shroud, before being able to disengage from the groove.

This further aims at limiting the problems relating to sealing as well as the efforts applied onto some moving parts (platform, disc . . . ).

The groove will provide an axial support against the platforms to the external portion of the sealing means, so as to ensure correct sealing between the platforms and the external portion of the sealing means.

According to a particular embodiment of the invention, the rim of the external split-ring comprises two cuts forming a lug, which is folded and arranged in the slit of the internal split-ring.

Such a lug ensures the anti-rotation between the two rings. The lug can also be formed on the internal split-ring, and be arranged in the slit of the external split-ring.

In a particular embodiment, the sealing means is formed radially outside the bottoms of the recesses.

As a matter of fact, it is important that, in spite of the mounting of the sealing means according to the invention, cooling air can freely flow axially through the bottoms of the recesses, so as to provide the cooling of the disc. This is mainly true in the first stages of the turbine, where the temperature of the jet is very high.

In a preferred embodiment of the invention, the blades consist of ceramic matrix composite. As explained above, the invention makes it possible to use such a material for the blades without the platforms being damaged.

The invention also relates to a turbine of a turbomachine comprising a rotating assembly as described in the present patent application.

The invention eventually relates to a turbomachine, such as a turbojet or a turbopropeller, comprising a rotating assembly as described in the present application for a patent.

BRIEF DESCRIPTION OF THE DRAWINGS

Other advantages and characteristics of the invention will appear upon reading the following description given as a non-restrictive example and while referring to the appended drawings, wherein:

FIG. 3 is a partial schematic view in axial cross-section of a rotating assembly according to the invention, i.e. a turbomachine or a rotating assembly stopped or in a certain operating condition wherein the arm 56 does not act yet as a radial stop for the sealing means 64,70;

FIG. 4 is a view showing a method adapted for obtaining the rotating assembly shown in FIG. 3;

FIG. 5 is a perspective view of one embodiment of the invention, wherein rotation locking means is formed between the sealing means of the inter-blade cavities, and the platforms of the blades;

FIG. 6 is a schematic view showing rotation locking means between the internal portion and the external portion of the sealing means according to the invention.

DETAILED DESCRIPTION OF THE PREFERRED EMBODIMENTS

Figure 1:
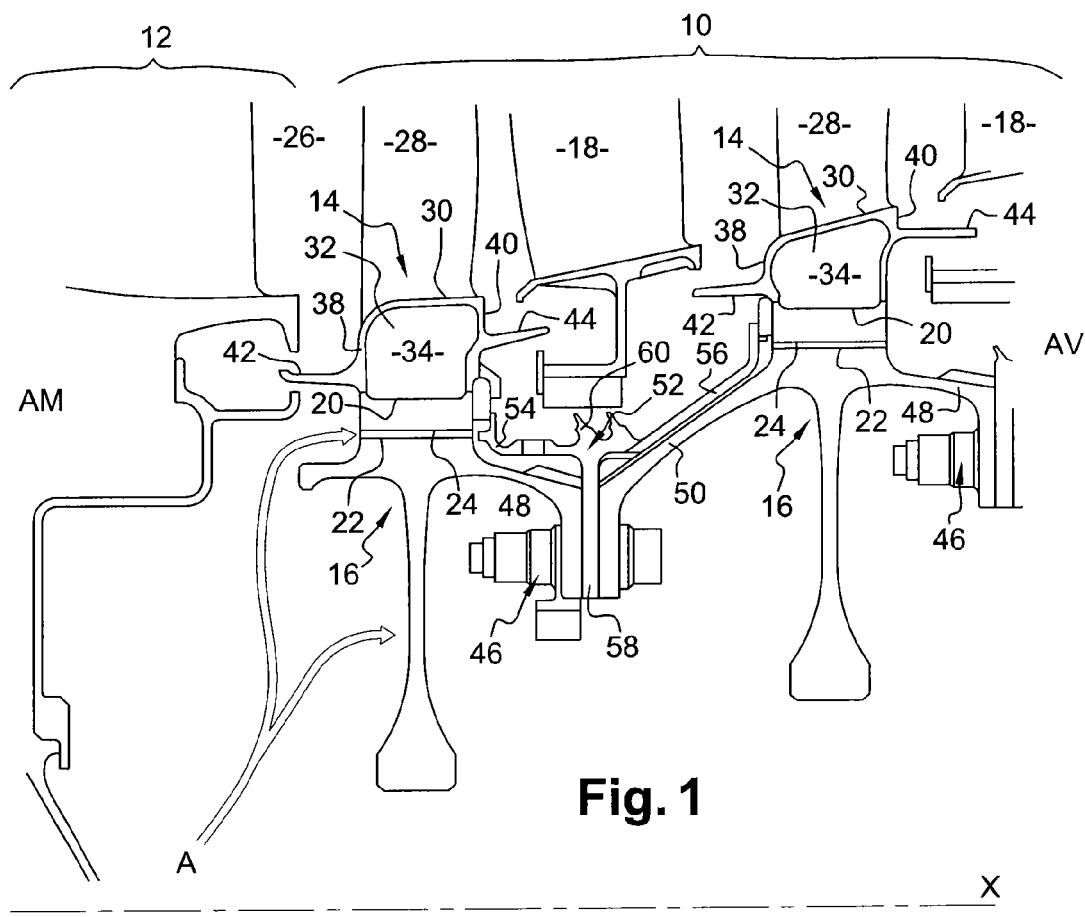
FIG. 1 is a partial schematic view in axial cross-section of a low-pressure turbine of a turbomachine according to the prior art.

Reference is first made to FIG. 1 which shows a low-pressure turbine 10 according to the technique of the prior art, arranged downstream of a high-pressure turbine 12. The low-pressure turbine 10 comprises axially alternating stages of annular rows of stationary blades 18, called distributors, and stages of rotating discs 16 provided on their periphery with a plurality of blades 14, with such stages being arranged around the X axis of the turbomachine.

In the present document, like in the technical field concerned, the terms upstream AM and downstream AV are so defined that upstream is axially on the side where the general flow of the turbomachine comes from, and downstream is axially on the side where the same flow flows to.

Each disc 16 comprises, on the external periphery of the teeth (the peak of which bears reference number 20) alternating with recesses (the bottom of which bears reference number 22) wherein blade roots (the internal end of which bears reference number 24) are axially engaged and radially retained, with such blades 14 extending radially from the recesses 22 in an annular jet 26 of a hot gas flow leaving the upstream combustion chamber (not shown).

Each blade more particularly comprises radially from the outside inwards a blade 28, a platform 30 extending substantially perpendicularly with respect to the blade 14 extension axis, and a tang 32 linking the platform to the blade root 24. The blade roots 24 have for instance a dovetail or similar shape to ensure the radial holding thereof in the recesses 22. The platforms 30 of the blades are arranged end to end on the circumference, so as to define together the ideal internal limit of the hot gas flow circulating in the turbine. According to such positioning, spaces are formed between two tangs 32 on the adjacent circumferences, in the annular zone extending radially from the platforms 30 up to the disc 16, and are called inter-tang or inter-blade cavities 34. So-called recess bottom cavities 36 are also formed by radial spaces separating the blade roots 24 of the bottoms 22 of the recesses. Side walls 38, 40 extend radially inwards from upstream and downstream of the platforms up to the roots 24 of the blades and form axial sealing means of the annular zone extending radially from the platforms 30 up to the discs 16, and thus of the inter-blade cavities 34, by providing the plugging thereof.

Such axial sealing of the inter-blade cavities 34 is important, since, if a portion of the jet gas circulates through such cavities, it takes no part in the driving into rotation of the blades 14 and directly heats the teeth 20 of the disc forming the bottoms of the inter-blade cavities 34, which leads to an increase in temperature of the discs 16, which might damage these or reduce the service life thereof.

The upstream radial side wall 38 of the platform is connected to a spoiler 42 extending upstream and the downstream radial side wall 40 is connected to a spoiler 44 extending downstream. The spoilers 42, 44 axially extend between the consecutive stages of the turbine so as to partially preserve the structural integrity of the jet 26 between each stage of the turbine, which limits the circulation of hot gas radially inwards the turbine.

The discs are fixed together by bolting, in 46, annular flanges 48, 50 which axially extend towards each other from each disc. A labyrinth ring 52 is also positioned axially between each couple of adjacent discs 16 and comprises annular arms upstream and downstream 54, 56 which axially extend up to these discs. The fastening flanges 48, 50 between the discs are thus protected from the jet gas by the arms 54, 56 of the labyrinth ring 52. The labyrinth ring 52 further comprises an internal radial annular side wall 58 for fixing discs to the bolting 46 of the flanges 48, 50, and cooperates with the internal ends of the blades 18 of the distributors by external annular sealing elements 60, so as to limit the circulation of the jet gas internally with respect to such blades 18.

In order to ensure the correct operation of the turbomachine, cooling air A is sampled, in a low-pressure or high-pressure compressor for example, and sent to the internal portion of the turbine up to the recess bottom cavities 36 so as to ensure the cooling of the disc 16 and to protect the latter from the heating caused by the hot gas of the jet flow 26. In order to enable cooling air A to circulate downstream of the recess bottom cavities 36, the latter open downstream internally with respect to the arm 54 of the labyrinth ring 52 axially bearing on the disc 16. Such configuration enables the cooling air A to circulate further radially downstream between the labyrinth ring 52 and the fastening flanges 48, 50 between the discs 16, so as to ensure cooling, too.

In operation, the hot gas circulating in the jet 26 may circulate through gaps (not shown) formed between the edges, opposite, on the circumference, the upstream and downstream radial side walls 38, 40 linked to the platforms 30 and axially covering the inter-blade cavities 34. The number of gaps 62 is relatively high since it directly depends on the number of platforms 30 forming the internal limit of the jet, which induces a non-negligible total leakage through the inter-blade cavities, which affects the performances of the turbine.

Besides, with the currently available industrial tools, manufacturing the assembly formed by the platform 30 and the radial side walls 38 and 40 as a single piece made of Ceramic Matrix Composite (C.M.C.) is not possible. Now, the recent developments preferably lead to using blades made of a C.M.C. material, since using such type of material more specifically makes it possible to reduce the weight of the blades and to increase the resistance thereof to high temperatures.

Figure 2:
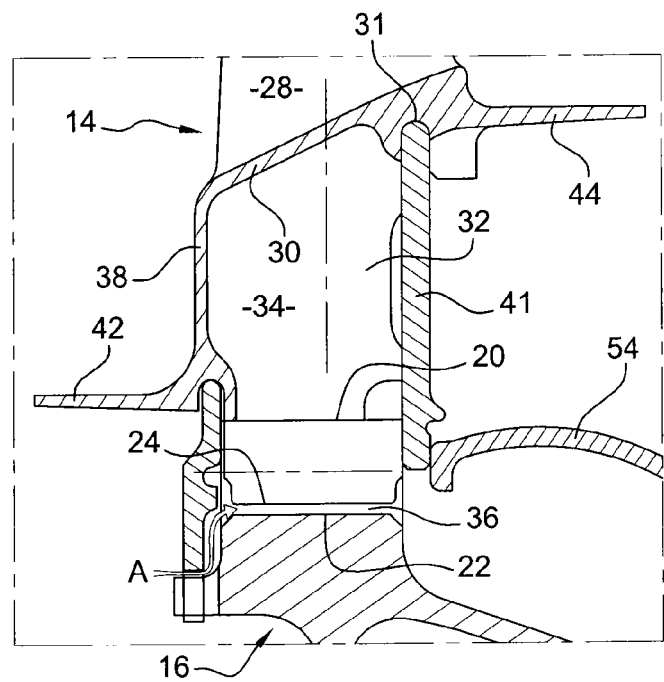
FIG. 2 is partial schematic view in axial cross-section of a rotating stage of the turbine according to the prior art.

In another type of embodiment of the prior art, shown in FIG. 2, a split-ring 41 which comprises a radial side wall radially extending between the blade roots 24 and the platforms 30 of the blades 14 is substituted for the side walls 40 of FIG. 1, which provide sealing downstream of the inter-blade cavities. The external end or periphery of the split-ring 41 is more particularly engaged in a radial annular groove 31 formed on the internal faces of the platforms 30. The split-ring 41 is additionally axially pressed against the disc 16 and the blades 14 by the arm 54 of the downstream labyrinth ring 52. To position the split-ring 41 in the groove 31, the split-ring 41 is so constrained as to close the slit by elastic deformation, which thus reduces the radius of the split-ring 41. A split-ring 41 is then arranged opposite the groove 31 and inside the latter, prior to releasing the constraint applied onto the ring 41 so that it recovers its original diameter and engages into the groove 31.

In this embodiment, in operation and thus in rotation, by centrifugal effect, the split-ring 41 tends to open and consequently to bear on the bottom of the groove 31, which generates undesirable constraints on the platforms 30. Besides, when the blades 14 are made of C.M.C., the relative dilatations between the split-ring 41 and the blades 14 enhance such constraints. Eventually, the slit of the split-ring 41 interrupts the circumferential symmetry of the rotating assembly, which creates unbalance, in rotation, and affects the performances of the assembly.

To be able to make the blades 14 of C.M.C., to limit leakages within the inter-blade cavities 34, or to prevent the above-mentioned unbalance, new axial sealing means of the annular zone extending radially from the platforms 30 up to the disc 16 therefore has to be designed, with such sealing means not generating too heavy a weight supported by the rotating platforms, caused by centrifugal effects.

The solution provided, according to the characteristics mentioned above in the present application, is shown in FIGS. 3 à 6.

In the embodiment shown, the sealing means according to the invention is formed downstream of the annular zone radially extending from the platforms 30 up to the disc 16, and comprising the inter-blade cavities 34. Similarly and symmetrically, such sealing means may be positioned upstream of this zone.

Referring to FIG. 3, the platforms 30 are thus connected at their upstream ends to side walls 38 which radially extend up to the teeth 20 of the discs, and each comprise spoilers 42 which extend upstream in the vicinity of their internal ends. The platforms 30 are additionally each connected at their ends downstream to a spoiler 44 which extends downstream.

The downstream sealing means consists of two respectively internal and external split rings 64, 70. The internal split-ring 64 consists of a radial side wall radially extending between a zone of the disc located at the blade roots 20, and approximately in the middle of the tangs 32. The internal split-ring 64 is held against the downstream ends of the tangs 32 and of the teeth 20 of the disc by an upstream annular arm 54 of a downstream labyrinth ring 52.

The cooling air A from the recess bottom cavities 36 can escape downstream by circulating inside the split-ring 64 and the upstream annular arm 54 of the downstream labyrinth ring 52, to axially follow the downstream flange 48 of the disc.

The internal split-ring 64 comprises two cylindrical annular rims 66, 68 downstream on their respective internal and external ends or peripheries.

The external split-ring 70 consists of a radial side wall and radially extends between the external end of the internal split-ring 64, and the groove 31 formed in the platforms 30. The external split-ring 70 comprises, on the internal end or periphery thereof, an upstream cylindrical annular rim 72, engaged radially inside and opposite the external rim 68 of the internal split-ring 64. The external split-ring 70 is additionally tightly adjusted between, on the one hand, the downstream side wall of the groove 31 which rests against the external periphery thereof, and on the other hand, the internal split-ring 64 resting against the internal rim 72 thereof.

In this mounting, the internal split-ring 64 is in an elastically deformed state obtained by enlarging the slit thereof, so that the split-ring 64 has a larger radius than in the resting condition. An elastic return thus tends to close the ring 64 inwards.

Similarly, the external split-ring 70 is in an elastically deformed state obtained by reducing the slit thereof, so that the split-ring 70 has a smaller radius than in the resting condition. An elastic return thus tends to open the ring 70 outwards.

Both split rings 64, 70 have been so dimensioned and adjusted that the elastic return forces mentioned above radially support the rims 68 and 72 on the whole circumferences thereof. Such support prevents the rings 64, 70 from returning to their respective state of rest, which makes it possible to preserve the elastic return forces in a balanced position between the two rings, and has a tight support between the rims 68 and 72. Such tight support provides sealing between the two rings.

The assembly is also so adjusted that, in this balanced position, the external periphery of the external the split-ring 70 is not in contact with the bottom of the groove 31, although the elastic return forces pushes it. Thus, in this balanced position, no constraint applies onto the platforms 30 of the blades 14, and even though a contact were created in operation because of the dilatations or of centrifugal forces, such constraints would significantly be reduced by the inwards elastic return generated by the internal split-ring 64.

In order to eliminate any possibility for the external split-ring 70 to disengage from the groove 31, in the balanced position the introduction distance of the ring 70 in the groove 31 is formed larger than the radial distance separating the internal rim 72 and the annular arm 54 of the labyrinth ring 52. The ring 70 will thus radially abut against the arm 54 before being able to disengage from the groove 31.

In the balanced state, the radial distance separating the internal rim 66 of the internal split-ring 64 and the annular arm 54 of the labyrinth ring 52 is also preferably formed so as to be smaller than the radial distance separating the external end of the external split-ring 70 and the bottom of the groove 31. Thus, if the assembly consisting of the two rings 64, 70 spreads and extends in operation, the rim 66 will abut against the arm 54 before the external ring 70 bears on the bottom of the groove 31, and applies constraints onto the platforms 30.

Although impossible to show in FIG. 3, the respective slits of the split rings 64, 70 are diametrally opposed, which makes it possible to avoid the creation of unbalance in operation.

FIG. 4 makes it possible to better understand how both split rings 64, 70 are mounted and arranged with respect to each other. It can be seen that a mounting tool 74 is first used which makes it possible to hold the internal split-ring 64 in an open state, i.e. with a larger radius than in the resting condition, thanks to an elastic deformation opening the slit of the ring, and axially against the downstream face of the disc 16 and of the blade roots 20.

The external split-ring 70 is then in a closed state, i.e. has a smaller radius than in the resting condition thanks to an elastic deformation closing the slit of the ring. In this condition, the external split-ring 70 can be positioned opposite the groove 31, and so that the cylindrical rim 72 can be arranged inside the cylindrical rim 68 of ring 64, which is in an open condition.

The external ring 70 is then released, so that it tends to be more widely open in the resting condition. The ring 70 then abuts against the bottom of the groove 31.

The mounting tool 74 is then removed. The internal ring 64 is closed by elastic return forces until the rim 68 abuts against the rim 72. The internal ring 64 closes on together with the external ring 70, until the elastic return forces of the respective rings 64, 70 are counterbalanced. The position of equilibrium shown in FIG. 3 is then reached.

FIG. 5 shows an anti-rotation arrangement between the external split-ring 70 and the rest of the rotating assembly formed by the disc 16 and the blades 14. It can be seen that the slit 76 of the ring 70 is inclined with respect to a radius of such ring. The ring 70 then comprises a peak 78 formed on the circumference opposite the external end of the slit 76. Such peak 78 is axially curved or folded downstream so as to form a circumferential stop, which cooperates with a protrusion 80 formed on the internal face of a platform 30, downstream of the groove 31.

FIG. 6 shows an anti-rotation arrangement between the external split-ring 70 and the internal split-ring 64. The slit 82 of the internal ring 64 is enlarged on its external periphery which also includes the rim 68.

Two radial cuts 84 are formed close to each other in the internal periphery of the external ring 70, which also includes the rim 72. A lug 86 is obtained between such two cuts 84, which is folded downstream and outwards. Such lug is introduced into the above-mentioned enlarged portion 88 of the slit 82 of the internal ring 64. Such lug 86 is thus held between the circumferential edges of such enlarged portion 88 of the slit 82, which drives the split rings 64 and 70 into rotation.

Some clearance is preferably left on the circumference between the lug 86 and the circumferential edges of the enlarged portion 88 of the slit 82, which is at least equal to the width of the slit 82. The slit 82 can then fully close, if necessary, without being constrained against the lug 86, in mounting or operating conditions.

The invention claimed is:

1. A rotating assembly for a turbomachine, comprising:
a disc having an external periphery provided with alternating recesses and teeth,
blades extending radially from the disc and the feet of which are axially engaged and radially retained in the recesses of the disc,
platforms circumferentially extending from the blades and being arranged circumferentially end to end, with respect to each other,
axial sealing means for an upstream and/or downstream sealing of an annular zone extending radially between the platforms and the disc, said sealing means radially comprising an internal annular portion and an external annular portion structurally distinct from each other,
wherein the rotating assembly is stopped, the external annular portion is so mounted as to be elastically constrained radially inwards by the internal annular portion with which it is engaged.

2. A rotating assembly according to claim 1, wherein the rotating assembly is stopped, the external annular portion of the sealing means is elastically deformed radially inwards by the internal annular portion, which is elastically deformed radially outwards by the external annular portion.

3. A rotating assembly according to claim 1, wherein the internal annular portion and the external annular portion of the sealing means are formed respectively with an internal split-ring and an external split-ring, with the respective slits of the rings being diametrally opposed.

4. A rotating assembly according to claim 3, wherein the slit of the external split-ring is inclined with respect to a radius of same ring, so that the external split-ring has a peak opposite the external end of the slit, with such peak being axially folded to form circumferential support against a stop formed on one of the platforms.

5. A rotating assembly according to claim 1, wherein a rotation locking means is formed between the internal annular portion and the external annular portion of the sealing means.

6. A rotating assembly according to claim 1, wherein the internal portion comprises an axial annular rim at the internal end which retains said axial annular rim radially by engagement with an annular arm of a shroud mounted downstream or upstream of the disc.

7. A rotating assembly according to claim 6, wherein the internal portion of the sealing means is axially held against the disc by said annular arm which rests thereon.

8. A rotating assembly according to claim 1, wherein said engagement between the respectively internal and external annular portions comprises, an axial annular rim axially shifted outside the disc and formed on the external end of the internal portion and fixed to an axial annular rim formed on the internal end of the external portion.

9. A rotating assembly according to claim 8, wherein the external portion of the sealing means comprises an external end engaged in a radial annular groove formed on the internal faces of the platforms, with said external portion radially abutting against the arm before being able to disengage from the groove.

10. A rotating assembly according to claim 8, wherein the rim of the external split-ring comprises two cuts forming a lug, which is folded and arranged in the slit of the internal split-ring.

11. A rotating assembly according to claim 1, wherein the blades are made of ceramic matrix composite.

12. A turbine of a turbomachine, comprising a rotating assembly according to claim 1.

13. A turbomachine, comprising a rotating assembly according to claim 1.

* * * * *